DEVICE FOR WAITING WITHIN AUTOMATIC TELEPHONE EXCHANGES

Filed Dec. 10, 1952 5 Sheets-Sheet 1

INVENTOR
NILS EMIL NILSSON
BY Frederick E. Hane
ATTORNEY

INVENTOR
NILS EMIL NILSSON
BY Frederick E. Hane
ATTORNEY

INVENTOR
NILS EMIL NILSSON
BY Frederick E. Hane
ATTORNEY

DEVICE FOR WAITING WITHIN AUTOMATIC TELEPHONE EXCHANGES

Filed Dec. 10, 1952 5 Sheets-Sheet 4

INVENTOR
NILS EMIL NILSSON
BY Frederick E. Hane
ATTORNEY

Jan. 7, 1958 N. E. NILSSON 2,819,345

DEVICE FOR WAITING WITHIN AUTOMATIC TELEPHONE EXCHANGES

Filed Dec. 10, 1952 5 Sheets-Sheet 5

INVENTOR
NILS EMIL NILSSON
BY Frederick E. Hane
ATTORNEY

United States Patent Office 2,819,345

Patented Jan. 7, 1958

2,819,345

DEVICE FOR WAITING WITHIN AUTOMATIC TELEPHONE EXCHANGES

Nils Emil Nilsson, Stockholm, Sweden, assignor to Telefonaktiebolaget L M Ericsson, Stockholm, Sweden, a company of Sweden Application December 10, 1952, Serial No. 325,073

Claims priority, application Sweden December 17, 1951

3 Claims. (Cl. 179—18)

The present invention relates to automatic telephone exchanges and affords to subscribers possibility of waiting until a busy line or an operating board is free or until answer is received from an operating board which has long answering times.

This is achieved by means of a waiting device, to which a calling subscriber's line is connected when dialing a certain number (e. g. calls to a certain number or calls marked by a special pre-digit, a device for automatic identification of a subscriber's line, which is connected to the waiting device, a first registering device associated with the waiting device, said registering device registering the number of the calling subscriber's line by means of said devices for automatic identification, a second registering device associated with the waiting device, said registering device being set in accordance with the number of a called line, and a testing device associated with the waiting device, which testing device, after the caller has put down his hand micro-telephone and has been disconnected from the waiting device, tests the condition on said called line by setting up a communication between the waiting device and the called subscriber's line by means of said second registering device and selectors connected to the telephone exchange, and by means of circuits for setting up a communication between said calling subscriber's line and said called line by the aid of said first and said second registering device and selectors connected to the telephone exchange, when said testing device finds the called line in a predetermined condition.

An embodiment of the invention intended for a telephone exchange with cross bar switches will be described below by means of the annexed drawings.

Figs. 1–4 are to be combined.

Figure 1:
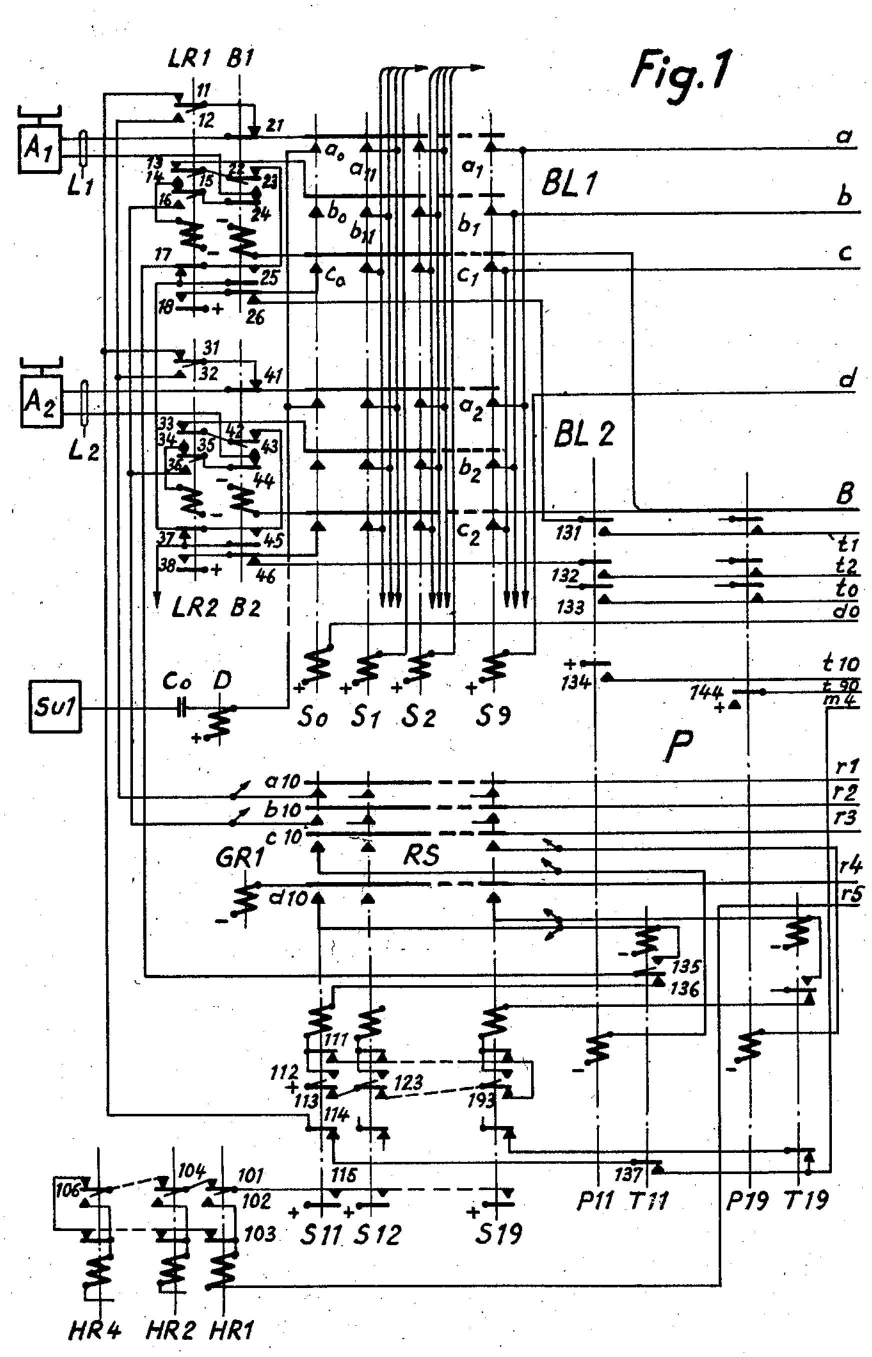
Fig. 1 shows two equipments of subscriber's lines, a register finder RS and relays P for identification of calling subscriber's lines.

The subscriber's lines L1 and L2 in Fig. 1 are each provided with its line relay LR1 and LR2 and its operating bar BL1 and BL2 in a cross bar switch with the selecting magnets S0—S9. To each selecting magnet there corresponds a link circuit SN in Fig. 2.

Figure 3:
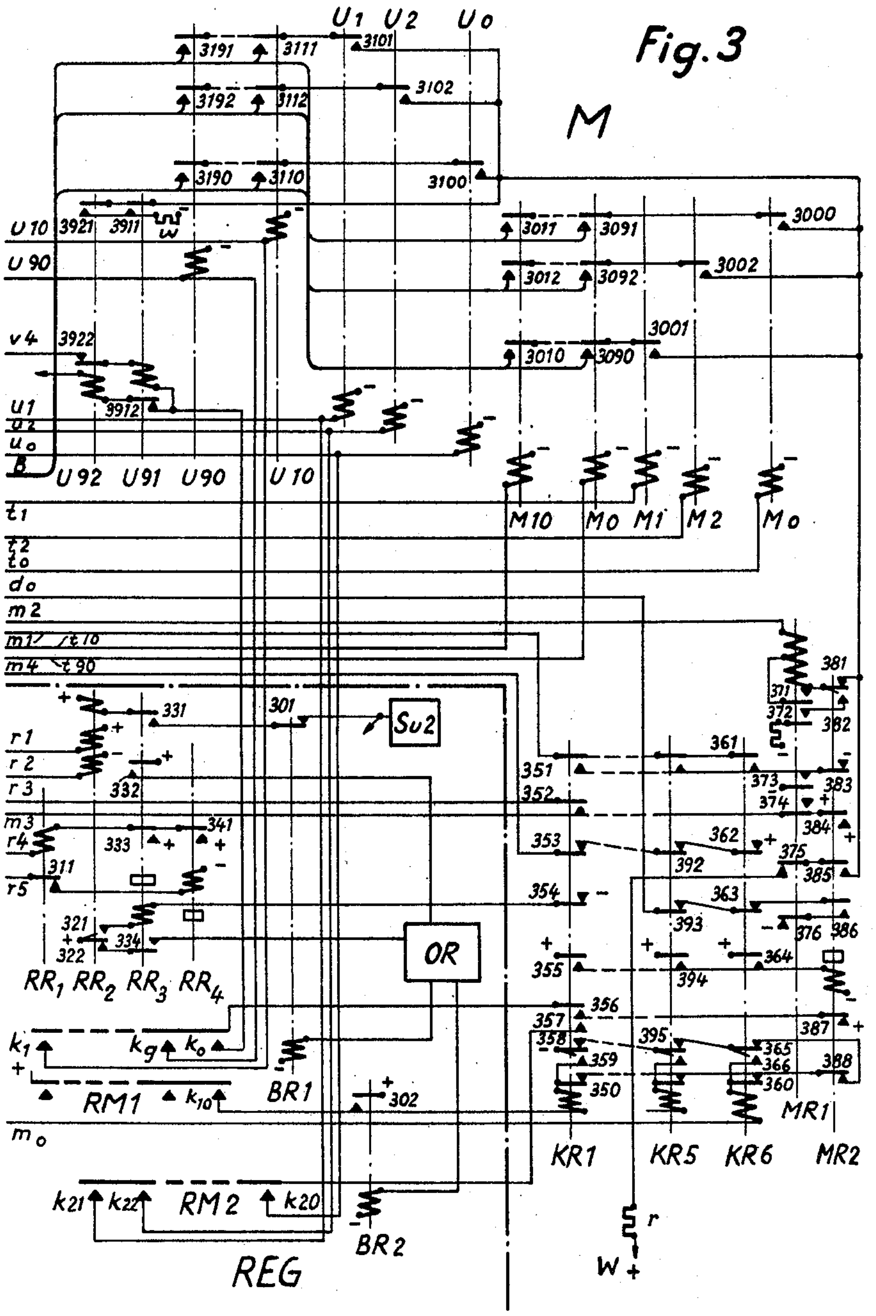
Fig. 3 shows a register REG and a marker M.

Those line relays LR1—LR2, which belong to the same tens number are so inter-connected that only a line relay at a time is attracted and therefore the attracted line relay connects the corresponding subscriber's line over a position reserved for the tens in a register finder RS associated with a register REG in Fig. 3. The register finders RS are operating bars in a cross bar switch with the selecting magnets S11—S19.

Figure 4:
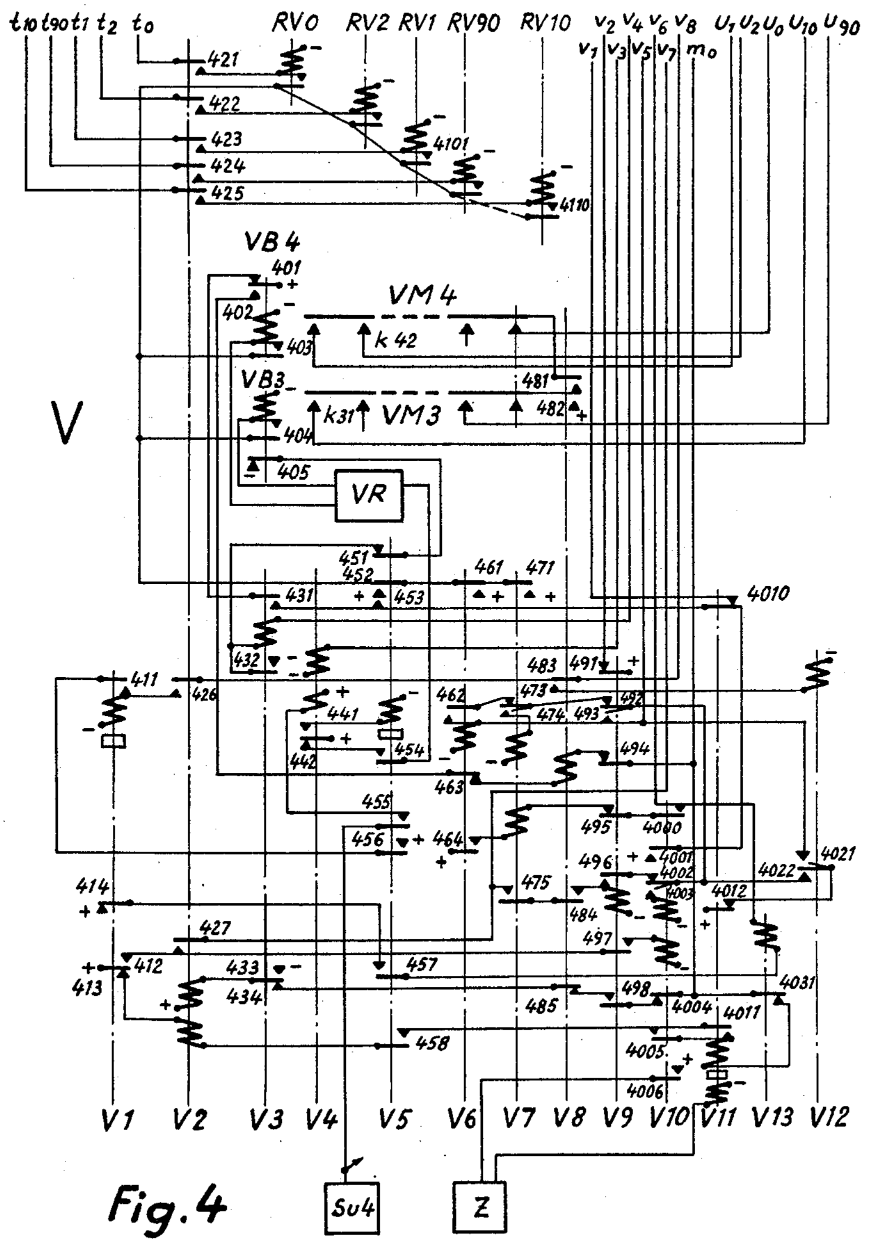
Fig. 4 shows a waiting device.
Figure 5:
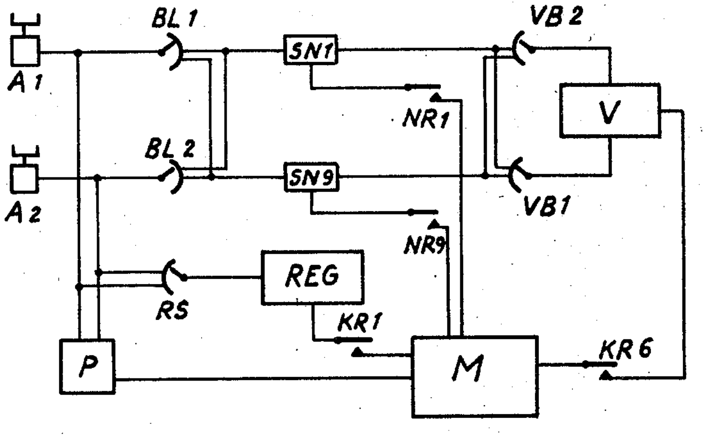
Fig. 5 is a general circuit system for connecting paths within the telephone exchange.
Figure 6:
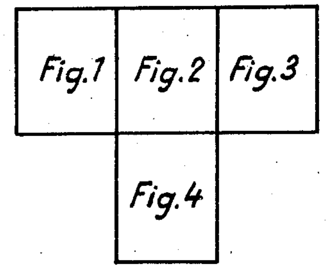
Fig. 6 shows how

The telephone exchange is a local exchange with merely short subscriber's lines and intended for 90 subscribers at the most. To enable waiting for a busy line to become free there are two waiting devices, V, one of which is shown in Fig. 4. Two waiting calls may occur simultaneously, one on each waiting device. In Fig. 5 A1 and A2 are two subscribers' apparatuses each being connected to its pre-selector BL1 and BL2, respectively. For setting up of communications between the subscribers' apparatus A1—B2 there is a number of registers REG, each having a register finder RS, a marker M and a number of link circuits RN1—SN9. Furthermore there is an identifying device P, which, when a register REG is connected to the marker M over the contact device KR1, indicates the subscriber's apparatus which is connected to the register.

The invention provides at least one waiting device V which by means of two selectors VB1 and VB2 can connect itself to the link circuits SN1—SN9 and by means of a contact device KR6 may be connected to the marker M.

A calling subscriber at for instance apparatus A1 is connected over a register finder RS to a register REG and dials the number of a called subscriber's apparatus A2 on his dial. The register REG connects itself to the marker M and actuates at the same time the identifier P, which indicates the calling subscriber's apparatus A1 by operation of relays in the marker M. The marker selects a free link circuit by means of the contact devices NR1—NR9 and connects the called subscriber's apparatus as well as the calling one to this link circuit. If the called apparatus A2 is busy the caller can connect himself to a free waiting device V by making a new call and by dialling the direction digit 0. The marker then inter-connects the calling apparatus A1 with a free link circuit, e. g. SNR1, by means of the selector BL1 and connects the selected link circuit to a waiting device by means of the selector VB1. At the same time the identifier P is actuated and the number of the calling apparatus A1 is registered in a first registering device pertaining to the waiting device V. The caller dials the number of the busy apparatus, which is registered in a second registering device pertaining to the waiting device and puts down his hand micro-telephone. The apparatus A1 and the link circuit SNR1 are released but the waiting device V connects itself over the selector VB2 to that link circuit, e. g. SN9, which keeps the called apparatus occupied.

When the called apparatus A2 is free the waiting device V by means of the marker M sets up a communication to the called apparatus over the selector VB2, a free link circuit and the selector BL2, whereby the latter is marked occupied without being called. Hereafter the waiting device sets up a communication to the calling apparatus A1 by the aid of the marker, whereby a calling signal is sent out. When answer is received from the apparatus A1, said two communications are disconnected and the waiting device V sets up a communication between the apparatus A1 and the apparatus A2 by the aid of the marker M, whereby a calling signal is sent to the apparatus A2. The waiting device V is released and the calling subscriber at A1 holds the communication.

If the calling subscriber A1 is occupied when it is called from the waiting device V, the waiting device connects itself to that link circuit which keeps the apparatus A1 occupied and sends a buzzer signal and then the waiting device is released.

At calls from the apparatus A1 in Fig. 1 the following circuit is completed: +, contacts 362—353 in Fig. 3, wire *m4*, contacts 137, 114, 11 and 21, subscriber's line L1 and apparatus A1, contacts 34 and 15, winding on line relay LR1, to minus. The contacts 11—18 are actuated whereby the following circuit is completed: +, contacts 113, 123—193, 11, winding on selecting magnet S11, contacts 136, 23 and 14, winding on line relay LR1, to minus. The selecting magnet S11 attracts its armature. The contacts 111—115 are actuated whereupon S11 and LR1 are energized over the contact 112. The contact 114 prevents further calls within that tens number, to which the apparatus A1 belongs. The contacts 111 and 114 blocks the selecting magnets S12—S19. The contact 115 closes circuits for selecting a free register. Each register has one relay in a relay chain HR1—HR4, in which only one relay at a time may be operated. The following circuit is supposed to be completed: +, contacts 115, 101, 104—106 and 103, winding on relay HR1, wire *r*5, contact 311 in register REG in Fig. 3, winding on relay RR4, to minus. The relay HR1 attracts its armature. The contacts 101—103 are actuated. The relay RR4 in Fig. 3 attracts its armature. The contact 341 is closed. The operating magnet GR1 is energized over the wire *r*4, winding on relay RR1 in Fig. 3 and contact 341 and attracts its armature. The contacts *a*10, *b*10, *c*10 and *d*10 are closed. At the same time the relay RR1 actuates its contact 311, whereupon the register REG is marked occupied. The relay T11 in Fig. 1 is operated over the contact *d*10 in parallel with the operating magnet GR1 and actuates the contacts 135—137. The contact 137 prevents other line relays within the same tens number as LR1 from being operated after S11 has released its armature.

The subscriber's line L1 is hereby connected to the register REG and the following circuit is completed: +, the intermediate winding of impulse relay RR2 in Fig. 3, wire *r*1, contacts *a*10, 12 and 21, line L1, apparatus A1, contacts 24, 16 and *b*10, wire *r*2, the lower winding of relay RR2, to minus. The relay RR2 attracts its armature and actuates the contacts 321—322. The slow operating holding relay RR3 is operated over the contacts 321, and 354 and actuates the contacts 331—334. The caller hears a buzzer tone which is generated by a tone generator S*u*2. The relay RR4, which is slow releasing, releases its armature, when the contact 311 is actuated but the contact 333 has time to be closed before the contact 341 is actuated.

The caller then dials the number of a called apparatus, e. g. A2 in Fig. 1, on his dial. Current impulses are then sent over the contacts 322 and 334 to a relay set OR, which counts the number of impulses in each impulse series and registers the first digit on a relay selector RM1 and the second digit on a relay selector RM2. The magnet BR1 is operated when the first digit is registered and the contact 301 is actuated and disconnects the buzzer generator S*u*2. The magnet BR2 is operated when the second digit is registered and closes the contact 302. The following circuit is completed: +, contact 302, winding on relay KR1, contacts 350, 388, 365, 395—358. The relays KR1—KR6 constitute a relay chain, in which only one relay at a time may be operated. The relay KR1 is supposed to attract its armature. The contacts 351—359 and 350 are actuated. The current of the slow operating holding relay RR3 is interrupted.

During the release time of the relay RR3 the following switching operation takes place:

(*a*) The contact 351 closes the following circuit: +, winding on one of the selecting magnets S1—S9 in Fig. 1, e. g. S9, wire *d*, contacts 216 and 226 in that link circuit SN, which corresponds to the selecting magnet S9, winding on selecting relay NR9, contacts 292, 274—284 and 294, wire *m*1, contacts 351 and 383, to minus. The selecting relays NR1—NR9 constitute a relay chain in which each link circuit SN has one relay and in which only one relay at a time may be operated. Here is supposed that the relay NR9 attracts its armature. The contacts 291—297 are actuated. Hereby a free link circuit has been selected and the selecting magnet S9 attracts its armature.

(*b*) The contacts 356 and 357 in Fig. 3 close the circuit over the contacts 387, 356 and 357, respectively, the one of the contacts *k*1—*k*9 and the one of the contacts *k*21—*k*20, which are closed, winding on the corresponding relay U10—U90 and U1—U0, respectively, to minus. One of the relays U10—U90 and one of the relay U1—U0 in the marker M attract their armatures. If the called apparatus A2 is supposed to have the number 12 the relays U10 and U2 will be operated and the contacts 3111—3110 and 3102 are closed. The following circuit is completed: +, contact 295 in Fig. 2, wire *m*2, the upper and the lower winding of the test relay MR1 in the marker M, contacts 381, 3102 and 3112, that wire of the bundle of wires B, which corresponds to the apparatus A2, winding on the operating magnet B2 in Fig. 1, to minus. If the apparatus A2 is free, the test relay MR1 is operated and the contacts 371—376 are actuated. The upper winding of the relay MR1 has a low resistance and the lower one has a high resistance. The contact 371 short circuits the lower winding and the operating magnet B2 in Fig. 1 attracts its armature. The contacts 41—46 and *a*2, *b*2 and *c*2 are actuated. The subscriber's line L2 is then connected to the wires *a*, *b* and *c* of the link circuit SN in Fig. 2.

(*c*) The contact 374 in Fig. 3 closes the following circuit: +, contacts 374 and 352, wire *r*3, contact *c*10, winding on relay P11 in the identifier P. The relay P11 attracts its armature. The contacts 131—134 are closed. The following circuits are completed: +, contact 134, wire *t*10, winding on relay M10 in the marker M to minus, and +, contacts 18, 26 and 131, wire *t*1, the winding of relay M1 in the marker M, to minus. The relays M1 and M10 attract their armatures. The contacts 3001 and 3011—3010 are closed. The operating magnet B1 of the apparatus A1 is operated in the following circuit: +, contact 295, wire *m*2, the upper winding of relay MR1, contacts 371, 381, 3001 and 3010, that wire of the bundle of wires B, which corresponds to the apparatus 1, winding on the operating magnet B1, to minus. The contacts 21—26 and *a*1, *b*1 and *c*1 are actuated. Hereby the subscriber's line L1 has been connected to the wires *a*, *b*, and *c* of the link circuit SN in Fig. 2.

When the holding relay RR3 in the register releases its armature, the contact 333 is actuated and the register is released when the operating magnet GR1 of the register finder RS releases its armature. The magnets BR1 and BR2 are released and the current of the relay KR1 is interrupted. The marker M is released.

When the apparatus A1 is connected to the link circuit SN the following circuit is completed: +, the upper winding of relay N2 and contact 211 connected in parallel with the upper winding of relay N3 and contact 223, wire *a*, contact *a*1, subscriber's line L1 and apparatus A1, contacts 23 and 14, winding on line relay LR1, to minus. The relay LR1 is operated and the relay N2 and N3 attract their armatures. The contacts 221—227 and 231—233 are actuated. The relay N3 is then operated over the contact 222 instead of 223. A holding circuit for the operating magnets B1 and B2 is closed over the rectifier R1, the contacts 241 and 225, the wire *c* and the contacts *c*1 and *c*2. A calling signal is sent to the apparatus A2 from the ringing generator RG, the transformer RGT, the interruptor I, the contact 231, the upper winding of relay N1, the contact 212, the wire *b*, the contact *b*2, 33 and 43, the line L2, the apparatus A2, the contact *a*2, the wire *a*, the contact 211, the electrolytic condenser E, the intermediate winding of relay N2 to +. The relay N1 is slow operating and is not operated by the calling current and the intermediate winding of relay N2 has a low resistance, and therefore the voltage drop of the calling current over the electrolytic condenser E and the intermediate winding of relay N2 is small. The caller hears a buzzer tone, which is sent from a buzzer generator S*u*3 over the contact 221 and the upper winding of relay N2.

When answer is received from the apparatus A2 the relay N1 is energized by direct current. The contacts 211—217 are actuated. The contact 211 interrupts the current of the line relay LR1, which releases its armature.

The relay N2 also releases its armature although slower due to the discharge current from the electrolytic condenser E. The two inter-connected apparatuses A1 and A2 are then supplied with current through the windings of the relay N3, which keeps energized the relay N1 in a circuit over the contacts 232 and 214. The holding circuit of the operating magnets B1 and B2 is changed from the contact 225 to the contact 215.

If the called apparatus A2 had been occupied the relay MR1 in the marker M would not have been energized. However the contact 355 closed a circuit of a time relay MR2, which is energized, whereby the contacts 381—388 are actuated and the following circuit is completed: +, winding on the selecting magnet S0 in Fig. 1, wire *d0*, contacts 393, 363, 386 and 376 to minus. The contact 383 interrupts the current of the selecting relay NR1—NR9 and the selecting magnets S1—S9. The contact 387 interrupts the current of the relay U1—U0 and U10—U90, and therefore the operating magnet B2 is not indicated. The operating magnet B1, however, is energized in the following circuit: the plus pole W+ of an auxiliary battery, the minus pole of which is connected to +, resistance *r*, contacts 375 and 385, contacts 3001 and 3010, that wire of the bundle of wires B, which corresponds to the apaparatus A1, winding on the operating magnet B1, to minus. The operating magnet B1 attracts its armature. The contacts 21—26 and the contacts *a0*—*c0* are actuated. The line relay LR1 is hereafter held in the following circuit: +, impedance coil D, contact *a0*, line L1 and apparatus A1, contacts 23 and 14, winding on relay LR1, to minus. The operating magnet B1 is energized over the contacts 18 and *c0*. The caller hears a buzzer tone, which is sent from a buzzer generator S*u*1 over the condenser C0. The register and the marker are released. When the subscriber puts down his hand microtelephone relay LR1 and magnet B1 release their armatures.

The line relays associated with the same tens are connected in series over the contacts 17, 37 and so on in Fig. 1, whereby only one line at a time may be connected to a register REG. When the operating magnet B1 or B2 of a line is operated the locking of the line relays is removed by the contacts 25 or 45 being closed. When the called apparatus A2 is occupied the caller can place himself in a waiting position by calling the waiting device V, Fig. 4. Then a new call is made and the direction digit 0 is dialled and registered on the relay selector RM1 in the register REG. The relay KR1 is operated over the contact *k*10 and is attracted. A free link circuit SN is selected whereby e. g. the relay NR9 and the selecting magnet S9 are operated. At the same time a free waiting device is selected by the following circuit: +, contacts 387, 356, *k*0, two circuits connected in parallel, one passing through the winding on relay U91 and contact 3922 and the other over contact 3912 and the winding on relay U92, wire *v*4, winding on relay V3 in Fig. 4, contacts 451 and 405, to minus. The relay U91 is supposed to attract its armature. The contact 3911 is closed. The test relay MR1 is operated over the contacts 381 and 3911 and the resistance *w* and attracts its armature. The contacts 371—376 are actuated. The calling apparatus is indicated by the identifier P when the relays M1 and M10 are operated as is described above and the operating magnet B1 is operated. Then the apparatus A1 is connected to the link circuit SN and the relays N2 and N3 in the same are attracted. When the relay NR9 is operating the following circuit is completed: +, contacts 296 and 201, the upper winding of the selecting magnet S29 to minus. The selecting magnet S29 attracts its armature. When the marker M is testing the waiting device V, the relay V3 in Fig. 4 attracts its armature. The contacts 431—434 are actuated. The relay V2 is operated in a circuit over the contact 433. The contacts 421—427 are closed, whereby the 10 units relays RV1—RV0 and the 9 tens-relays RV10—RV90 are connected to the identifier P over the wires *t*1—*t*10 and *t*10—*t*90. At the same time as the relays M1 and M10 of the marker are operated the relays RV1 and RV10 in Fig. 4 are also operated. The contacts 4101 and 4110 are closed.

The contact 431 is closed in the following circuit: +, contacts 401 and 431, wire *v*1, winding on operating magnet VB1, to minus. The contacts *e*2, *f*2, *g*2 and *h*2 are closed. The relay N1 in the selected link circuit SN is operated through the following circuit: +, contact 491 in Fig. 4, wire *v*2, contacts *f*2 and 233, the lower winding of relay N1, to minus. The line relay LR1 in Fig. 1 is released during the release time of the relay N2. The following circuit is completed: +, the upper winding of relay N3, contact 223, wire *a*, contact *a*1, line L1 and apparatus A1, contacts 23, 13 and *b*1, wire *b*, contact 213, partly the lower winding of relay N3 to minus, partly contact *g*2 and wire *v*3, the upper winding of relay V4 in Fig. 4 to minus. The relay V4 attracts its armature. The contacts 441 and 442 are actuated. The relay V5 is operated over the contact 441 and attracts its armature. The contacts 451—458 are actuated. The caller at the apparatus A1 now holds the link circuit SN as well as the waiting device V. The register and the marker are released. The relays V3 and V2 in Fig. 4 release their armatures.

The calling subscriber hears a buzzer tone, which is sent from a buzzer generator S*u*4 over the contact 455 and the lower winding of relay V4 and dials the number of the called apparatus A2 on his dial. The impulses are repeated by the relay V4, whereby current impulses are sent over the contacts 442 and 454 to a relay set VR, which attends to registration of the first digit 1 of the relay selector VM3 and the second digit 2 of the relay selector VM4 and operation of the magnets VB3 and VB4. The contacts 401—405 and *k*31 and *k*42 are actuated. The following circuit is completed: +, contacts 402 and 463, winding on relay V8, contact 494, wire *m*0, winding on relay KR6, contacts 360, 388, 365, 395—398 to minus. The relays V8 and KR6 attract their armatures. The contacts 481—485 and 360—366 are actuated. The contacts 481 and 482 close circuits over *k*31 and *k*42 and the wires *u*10 and *u*2 of the relays U10 and U2 in the marker M, Fig. 3. A free link circuit SN is selected. The corresponding relay in the relay chain NR1—NR9 is attracted and the test relay MR1 is connected to the operating magnet B2 of the called apparatus A2. As the called apparatus is occupied the relay MR1 is not attracted. The time relay MR2 attracts its armature. The contacts 381—388 are actuated. The selected link circuit SN is released by the contact 383. The following circuit is completed: W+, resistance *r*, contacts 375, 385, 3102 and 3112, the wire of the bundle of wires B, which corresponds to the apparatus A2, the contact e. g. *c*2, which belongs to the link circuit keeping the apparatus A2 occupied, wire *c*, one of the contacts 215 and 225, contact 241, the lower winding of the selecting magnet S29, winding on relay MR3 to +. The relay MR3 and the selecting magnet S29 of the link circuit which keeps the apparatus A2 busy, attract their armatures. The following circuit is completed: +, contact 202, wire *v*8, contact 483, winding on relay V12, to minus. The relay V12 is attracted and actuates the contacts 4021—4022. The relay V6 is operated over the contacts 4012 and 4021, attracts its armature and actuates the contacts 461—464. The operating magnet VB2 is energized in parallel with the winding of relay V6 over the wire *v*5 and attracts its armature. The contacts *e*1 and *f*1 are closed. Thus the waiting device V has been connected to that link circuit SN, which keeps the called apparatus A2 occupied. The calling subscriber puts down his hand microtelephone. The relays V4 and V5, of which V5 is slow-releasing release their armature. The operating magnet VB1 releases its armature. The apparatus A1 and that link circuit SN, to which the selector VM1 has been connected, are released. The marker is released, when the contact 463 is actuated.

The waiting device has now the number of the calling apparatus A1 registered on the relays RV0—RV90 and the number of the called apparatus A2 registered on the selectors VM3 and VM4 and is connected to that link circuit SN, which keeps the apparatus A2 occupied. The relays V8 and V12 have released their armatures and V6 and VB2 are kept operated over the contacts 4012, 4022, 492, 473 and 462. When the apparatus A2 is free, the following circuit is completed: +, contact 464, the lower winding of relay V7 which has a high resistance, contacts 495 and 4000, wire *v6*, contacts *f1*, 227 and 217, the lower winding of relay N3, to minus. The relay V7, not N3, is attracted in this circuit. The contacts 471 and 473 to 475 are actuated. The contact 473 interrupts the current of the relay V6, said relay together with the operating magnet VB2 releasing their armatures. The link SN and those two subscribers' lines, which have been connected to the same, are released.

Figure 2:
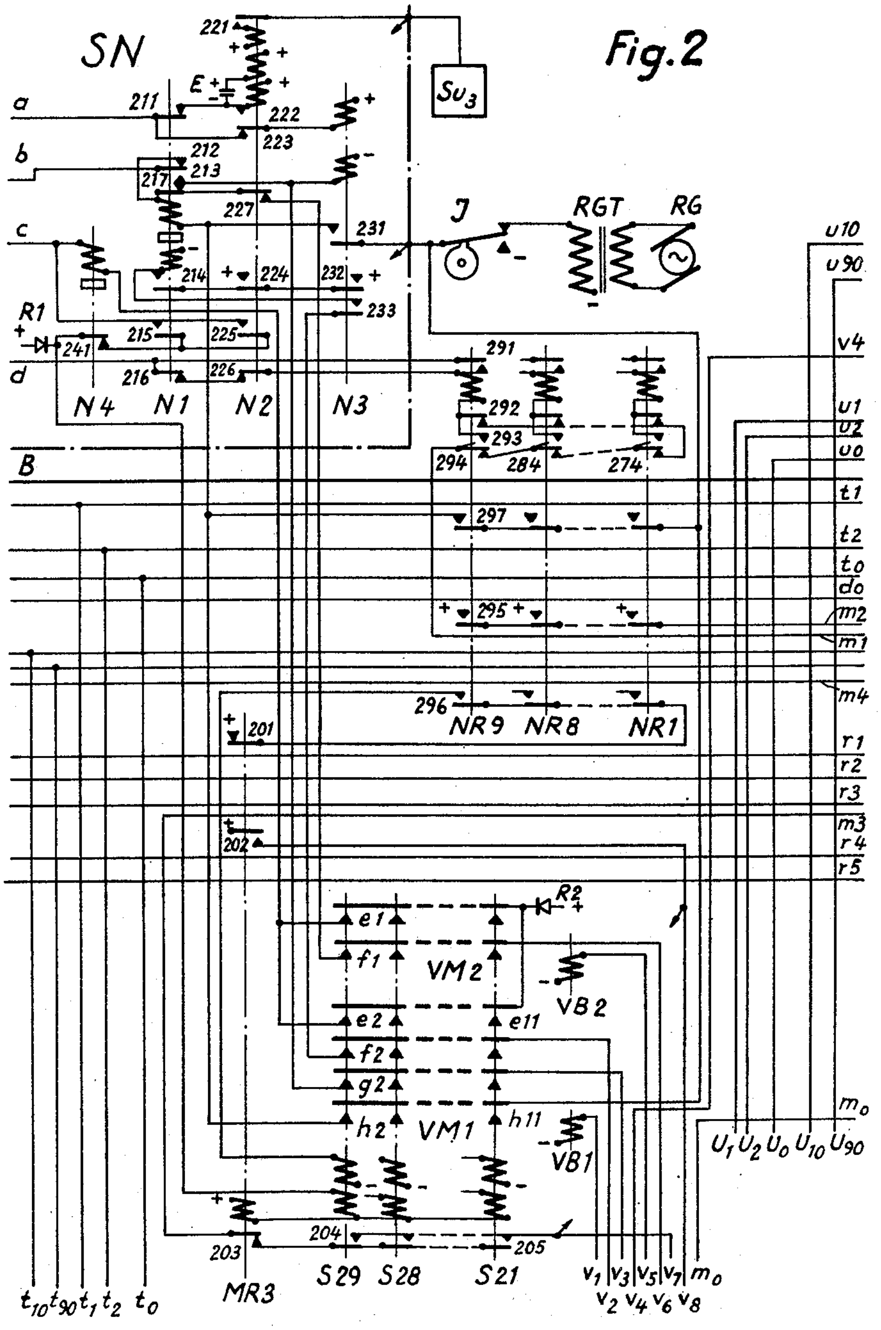
Fig. 2 shows a link circuit SN and selectors for connecting a waiting device to the link circuits.

When the contact 463 is closed, the waiting device is again connected to the marker M over the wire *m0* and the relays V8 and KR6 attract their armatures. The apparatus A2, which this time is free, is again called. A free link circuit SN is selected and e. g. the relay NR9 in Fig. 2 is attracted together with the selecting magnets S9 and S29. The test relay MR1 of the marker M is attracted. The following circuit is completed: +, contact 374 in Fig. 3, wire *m3*, contact 203 in Fig. 2, contact 204, wire *v7*, contacts 475 and 484, winding on relay V9 to minus. The contacts 491—498 are actuated. The current of the relay V8 is interrupted by the contact 494. The relay V8 releases its armature and the relay V9 is kept operated over the contacts 496, 402, 4022 and 4012. The operating magnet VB2 is energized over the contacts 4012, 4022 and 493 and the wire *v5*. The called subscriber's line is marked occupied through the following circuit: +, rectifier R2 in Fig. 2, contact *e1*, winding on relay N4, wire *c*, contact *c2*, winding on the operating magnet B2, to minus. The relay N4 is operated and the contact 241 is actuated.

The calling subscriber, who is waiting at the apparatus *a1*, is then called through the following switching operation. The contact 498 closes the following circuit: +, the upper winding of relay V2, contacts 434, 485, 498 and 4004, wire *m0*, winding on relay KR6, contacts 360, 383, 365, 395—358, to minus. The waiting device is connected to the marker when the relay KR6 attracts its armature and the apparatus A1 is indicated by the relay V2 closing the contacts 421—427. A free link circuit SN is selected, whereby e. g. the relay NR1 and the selecting magnets S1 and S21 attract their armatures. The test relay of the marker MR1 is connected to the winding of the operating magnet B1.

(*a*) If the apparatus A1 is free, the relay MR1 and the operating magnet B1 are operated and the following circuit is completed: +, contact 374 in Fig. 3, wire *m3*, contacts 203 and 205, wire *v7*, contacts 427 and 497, the upper winding of relay V10, to minus. The relay V10 attracts its armature. Contacts 4001—4006 are actuated. The contact 4001 closes a circuit over the wire *v1* of the operating magnet VB1, which is operated and connects the waiting device to the selected link circuit, to which the apparatus A1 is simultaneously connected when the operating magnet B1 is operated. The contact 4002 interrupts the current of the relay V9, which releases its armature. The relay V10 is kept operated over the contact 4003. The marker is released by the contact 4004 breaking the circuit of the relays V2 and KR6. The contact 492 is closed before the contact 493 is actuated, and therefore the relay V6 is kept operated over the contacts 462, 473, 492, 4022 and 4012. The operating magnet B1 is in this case kept operated by the relay N4, the contact *e11* and the rectifier R2, and therefore the contact 241 in the link circuit SN is actuated before one of the contacts 215 and 225 is closed, whereby short-circuiting of the winding of the relay N4 is prevented. A calling signal is now sent to the apparatus A1 from the link circuit corresponding to the selecting relay NR1 through the following circuit: +, the intermediate winding of relay N2, the electrolytic condenser E, contact 211, wire *a*, contact *a11*, line L1, apparatus A1, contacts 23, 13 and *b11*, wire *b*, contact 212, the upper winding of relay N1, contact *h11*, the calling transformer RGT, to minus. When the waiting subscriber answers, the relay NR is operated through its upper winding in series with the upper winding of the relay N1. The contacts 221—217 and 231—233 are actuated. The relay N3 is connected to the subscriber's line L1 and the relay N1 is kept energized over the contacts 214 and 234. In parallel with the lower winding of the relay N3 the relay V4 in Fig. 4 is operated and the contacts 441—442 are actuated. The relay V5 is operated and the following circuit is completed: +, contacts 414 and 457, winding on relay V13, wire *v6*, contacts *f1*, 227 and 217 and the lower winding of relay N3, in the link circuit corresponding to the selecting relay NR9. The relays V13 and N3 attract their armatures. The contact 4031 prevents the relay V11, which is slow-operating, from being operated, when the contact 458 is closed. Over the contact 231 in the link circuit SN a calling signal is sent to the apparatus A2. The waiting subscriber at the apparatus A1 hears a buzzer tone from the generator *Su4* in Fig. 4. The contact 4006 of the relay V10 closes a start circuit of a time relay Z, which after a certain time closes current through the lower winding of the relay V11, which releases the waiting device if answer is not received from the apparatus A1 or A2. When answer is received from the apparatus A2, the relay N1 in the link circuit SN is operated. The current of the relay V13 in the waiting device is interrupted in the contact 217. The relay V13 releases its armature and the following circuit is completed: +, contact 413, the lower winding of relay V2, contacts 458 and 4005, the upper winding of relay V11, contact 4031, wire *m0*, winding on relay KR6, contacts 360, 388, 365, 395 and 358 to minus. The relays V2, V11 and KR6 attract their armatures. The contacts 421—427, 4010—4012 and 360—366 are actuated. The current of the relay V10 and V6 and the operating magnets VB1 and VB2 is interrupted. The two subscribers' apparatuses A1 and A2 are released, but they cannot produce a new call as the wire *m4* is broken in the contact 362 in Fig. 3. During the release time of the slow-operating relay V5 the following switching operation takes place: The relay V8 is connected to the wire *m0* when the relay V4 releases its armature, and is operated. A free link circuit SN is selected by the selecting relays NR1—NR9. The corresponding selecting magnet e. g. S9 attracts its armature. The test relay MR1 is connected to the two operating magnets B1 and B2 and attracts its armature. The operating magnets B1 and B2 are operated and connect the lines L1 and L2 to the selected link circuit. The relays N1 and N3 in the link circuit SN are operated in a circuit over the contact 297, which is closed by the relay NR9 in the connecting moment. Hereafter the two apparatuses A1 and A2 have been connected together. The waiting device V and the marker M are released when the relay V5 in Fig. 4 releases its armature.

(*b*) If the apparatus A1 of the waiting subscriber is occupied, when the waiting device calls the same, the test relay MR1 in the marker will not be operated but the time relay MR2 energizes its contacts 381—388. That link circuit which keeps the apparatus A1 occupied is indicated when the corresponding selecting magnet is operated, e. g. S28 in Fig. 2. The relay MR3 energizes the contacts 201—203 and the following circuit is completed: +, contact 202, wire *v8*, contact 426, the winding of relay V1 to minus. The contact 411—414 are actuated. The relay V10 attracts its armature in a circuit over the contacts 412 and 497. The operating magnet VB1 attracts its armature and the waiting device V is connected to that link circuit, which keeps the apparatus A1 occupied. The relays V4 and V5 are operated. A buzzer tone from the buzzer generator S*u*4 is sent to the occupied apparatus A1 and indicates that the waiter may call the apparatus A2. The relay V1 is kept operated over the contacts 456 and 411. The time relay Z is kept operated over the contact 4006. After a certain time the time relay Z connects current to the lower winding of the relay V11, which releases the waiting device without calling the marker.

I claim:

1. In an automatic telephone system with subscribers' lines, links and selectors connecting said lines and control means for setting said selectors, a waiting device, circuit means for connecting a calling subscriber's line to said waiting device when dialling a certain number, an access switch for connecting the waiting device to said links, means automatically identifying the respective subscriber's line connected to the waiting device, said waiting device comprising a first registering device registering the number of the calling subscriber by means of said identifying means and a second registering device set by the calling subscriber in accordance with the call number of the line of the called subscriber, a change-over relay means included in said control means, a marking circuit, said change-over relay means in response to a call to said called subscriber's line closing said marking circuit, when the called line is busy, over the connection of the called line to the link holding the called line busy, testing means which upon disconnection of the calling subscriber from the waiting device establish a control connection between the waiting device and the called subscriber's line by means of said selectors, the control means and the registration in said second registering device for testing the condition of the called line, means connecting said testing means to the respective link through said access switch by means of said marking circuit, and actuating means establishing a connection between the line of the calling subscriber and the line of the called subscriber by means of the respective links, the selectors, the control means and the registrations in said first and said second registering devices in response to said testing means finding the line of the called subscriber in a predetermined condition.

2. In an automatic telephone system according to claim 1, an auxiliary switch included in the waiting device, relays actuated by said testing means in response to the testing means finding said called subscriber's line in said predetermined condition, said relays connecting the waiting device to the calling subscriber's line by means of the registration in said first registering device, said auxiliary switch and said controlling means, and means connected by said auxiliary switch for calling the waiting subscriber.

3. In an automatic telephone system according to claim 1, an auxiliary switch included in the waiting device, relays actuated by said testing means in response to the testing means finding said called subscriber's line in said predetermined condition, said relays connecting the waiting device to the calling subscriber's line by means of the registration in said first registering device, said auxiliary switch and said controlling means, and means connected by said auxiliary switch for calling the waiting subscriber, and means in the waiting device rendered operative in response to an answer by the waiting subscriber, said last mentioned means releasing said means connected by the auxiliary switch and actuating said operating means.

References Cited in the file of this patent

UNITED STATES PATENTS

| | | |
|---|---|---|
| 1,857,833 | Baker et al. | May 10, 1932 |
| 2,359,626 | Crocker | Oct. 3, 1944 |
| 2,534,500 | Claesson et al. | Dec. 19, 1950 |